Feb. 10, 1970  H. D. HOWELL, JR., ET AL  3,494,124
TWO-PART SHACKLE PIN
Filed May 22, 1968
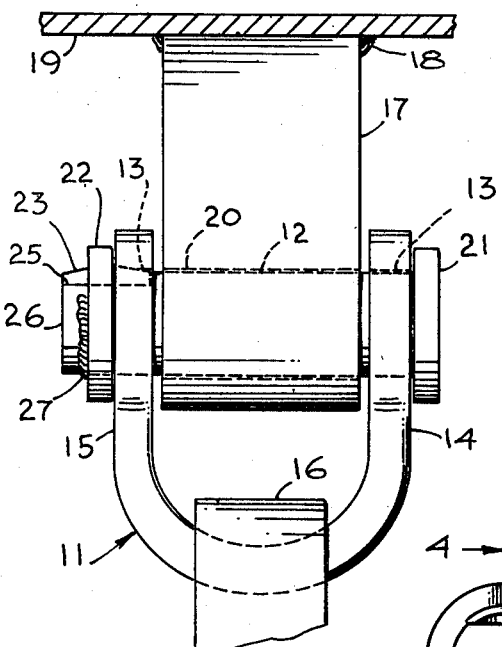
Fig. 1
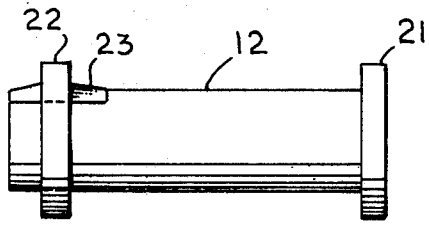
Fig. 2
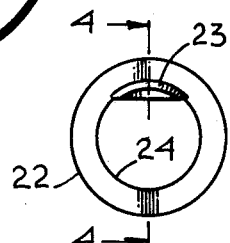
Fig. 3
Fig. 4
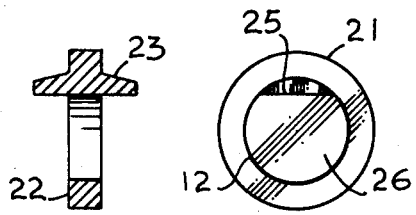
Fig. 5
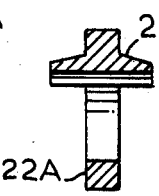
Fig. 6
Fig. 7
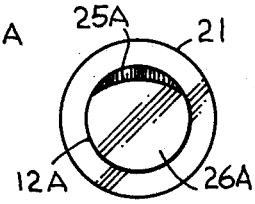
Fig. 8
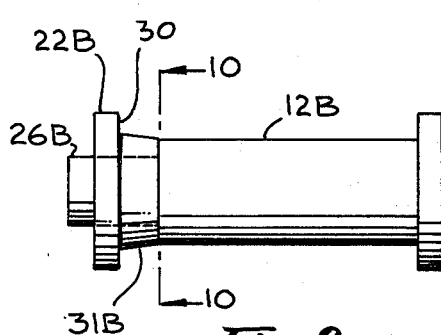
Fig. 9
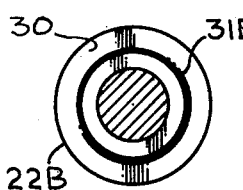
Fig. 10
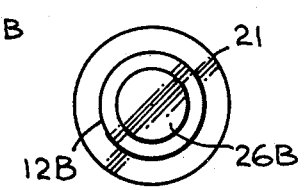
Fig. 11
INVENTORS
HARRY D. HOWELL, JR.
WILLIAM J. GILLMAN
BY
ATTORNEY United States Patent Office 3,494,124
Patented Feb. 10, 1970

3,494,124
TWO-PART SHACKLE PIN
Harry D. Howell, Jr., Colton, Calif. (1325 Sylvan Blvd., Apt. 4, Redlands, Calif. 92373), and William J. Gillman, 15800 Rim Rock Road, Apple Valley, Calif. 92307
Filed May 22, 1968, Ser. No. 731,035
Int. Cl. F16g *13/06, 13/08;* F27b *7/00*
U.S. Cl. 59—86                                   10 Claims

ABSTRACT OF THE DISCLOSURE

A two-part shackle pin for use in welded assemblies of high temperature cast shackles and pins which includes wedging means for temporarily holding the two-part pin in place in the shackle preparatory to welding the pin parts together; and especially adapted for use in cramped and hot locations, as for example in the repair mounting of chains inside rotary cement kilns.

BACKGROUND OF THE INVENTION

In rotary cement kilns it is customary to hang chains from the periphery to serve as heat reservoirs which pick up heat from the hot gases and transfer the heat to the cement-forming charge which tumbles in the bottom portion of the kiln. The chains are generally attached by shackles to brackets which protrude from the kiln shell inwardly through the kiln lining. The chain is linked to the rounded end of the U-shaped shackle. After a chain is linked over the shackle, the shackle pin is inserted into the eyes of the shackle, the hole in the bracket being engaged by the pin. It is the usual practice to use a threaded bolt for the shackle pin, and a threaded nut to secure the pin in place. In cement kilns and similar applications where it is imperative that the shackle pin function for a long period of time at high kiln operating temperatures, it is also customary to then weld the nut to the threaded pin. Considering the high temperature conditions encountered in the repair of the chain attachments in cement kilns during shutdown periods, and the cramped working space, it is desirable to not encumber the workman with wrenches or clamps, but instead to provide a simple one-hand-operated means to hold the shackle, an unthreaded pin, a bracket, and a chain temporarily assembled together and in place in the kiln, while the pin is being permanently welded to the collar.

SUMMARY OF THE INVENTION

The two-piece non-threaded cast shackle pin of this invention consists of a cylindrical main portion with an integral head at one end abutting one leg of the U-shaped shackle body, and a separable collar for abutting the other leg, there being wedging means attached to the separable collar, whereby the parts are temporarily held together until the welder can make a permanent welded joint between the separable collar and the pin. The wedging means may frictionally engage the pin, or the shackle eye, or both. The advantage of the invention is that the welder needs no tools (except his welder's torch) and can quickly and simply assemble the shackle between the bracket and the chain, and by a frictional wedging means hold the parts in place while the pin is being welded to the separable collar. An advantage is the much lower cost of the non-threaded assembly means, which is especially significant when high alloy heat resistant parts are used for the shackle assembly, because these can be made economically by the molten steel casting process.

DESCRIPTION OF THE DRAWINGS

The preferred form of the invention is shown in FIGS. 1 to 5 of the drawings, in which:

FIG. 1 is an assembly of a kiln bracket, and a length of chain, joined by a shackle means with welded-in shackle pin;

FIG. 2 is a side elevational view of the preferred two-piece non-threaded shackle pin;

FIG. 3 is an end elevational view of the separable collar member and integral wedging key;

FIG. 4 is a cross-sectional view taken on the line 4—4 of FIG. 3;

FIG. 5 is an end view of the pin and fixed collar, viewed from the end of the pin which receives the separable collar member;

FIG. 6 is an end elevational view of an alternative form of a separable collar member and integral wedging key;

FIG. 7 is a cross-sectional view taken on the line 7—7 of FIG. 6;

FIG. 8 is an end view of the pin and fixed collar viewed from the end of the pin which receives the separable collar member;

FIG. 9 is a side elevational view of a second alternative form, of the assembly of a non-threaded shackle pin having a fixed collar at one end, and at the other end a separable collar with an integral wedging hub directed toward the fixed collar;

FIG. 10 is a cross-sectional view of the shackle pin member and separable wedging collar member taken from the position 10—10 of FIG. 9; and FIG. 11 is an end elevational view of the shackle pin member only of the assembly shown in FIG. 9.

Referring to FIGS. 1 through 5, a U-shaped shackle body 11 having a shackle pin 12 held in the eyes 13 of its two legs 14 and 15, connects a length of link chain by its end link 16 to a supporting bracket 17 which is rigidly attached, as by welding 18, to the steel shell 19 of a rotary kiln or the like. The bracket 17 is provided with an aperture 20 so that the pin may turn therein. The pin 12 has an integral collar 21, and a separable (prior to its welding) collar 22. Prior to the welding of the pin 12 to the separable collar 22 in an assembly, the separable collar is frictionally held by the wedge key 23 which is integrally formed and disposed in an axial direction on the inside cylindrical surface 24 of the collar 22, extending on one or both sides of the collar 22. The wedge key 23 co-acts with a flat surface 25 provided on the periphery of the pin near its free end 26, the end wall of the flat acting as a stop which defines the proper axial position of the separable collar on the pin. The wedge key 23 will temporarily keep the assembly together until a weld 27 is provided which secures the separable collar 22 to the pin. When the wedge key 23 extends on both sides of the collar 22, it makes the collar reversible, and also provides a larger frictional contact with the flat surface 25.

Referring particularly to FIGS. 6 to 8, this alternative form involves a key member 23A, which on its curved top surface is tapered longitudinally from the inside face of the separable collar 22 to the leading edge, the bottom surface of the said key member being curved to match the curvature of a "flat" 25A on the free end portion of the pin, which "flat" has a curvature (at right angles to the pin axis) which is greater in radius than the main portion of the pin. The key 23A, then, has a crescent shaped cross-sectional shape, the key being also tapered longitudinally so that it makes a wedging engagement with the surface of the eye of an adjacent shackle leg, when the pin is assembled in the shackle.

The second alternative structure for the shackle pin is shown in FIGS. 9 to 11, in which the pin member 12B consists of a cylindrical main portion and in integral collar 21. In this form the free end portion 26B of the cylindrical pin is reduced slightly in diameter to receive a separable collar 22B which includes on its inside face 30 an integral concentric cone or wedge boss 31B which is adapted to frictionally engage the edge surface of one eye 13 of a shackle leg to thereby temporarily hold together the separable collar 22B on the shackle pin 12B. The temporary assembly of the pin, collar and shackle is then made permanent by welding of the collar 22B to the reduced diameter pin portion 26B.

The parts of the pin assembly, as well as the shackle, are preferably made by casting from high temperature and wear-resistant nickel chromium steel.

We claim:

1. A shackle assembly comprising a U-shaped shackle having spaced apart legs with eyes for a shackle pin; a shackle pin consisting of a cylindrical center portion with an integral collar at one end, and a separable collar slidably mounted on said pin near the free end opposite said integral collar; and friction means on said separable collar for temporarily holding said collar in selected position on said pin pending the permanent welding of said separate collar to said pin.

2. The shackle assembly as defined in claim 1, in which the said friction means consists of an axially extending flat area on the periphery of the free end portion of said pin, and a wedge key affixed in an axial direction to the inside wall of said separable collar, said key frictionally engaging said flat area.

3. The shackle assembly as defined in claim 1, in which the said friction means on said separable collar consists of a tapered conical boss adapted to frictionally engage the eye in the adjoining leg of a shackle in said assembly.

4. The shackle assembly as defined in claim 1, in which the said friction means on said separable collar consists of a tapered conical boss adapted to frictionally engage the eye in the adjoining leg of the shackle, and means on said pin to position said separable collar.

5. A shackle assembly comprising a U-shaped shackle having spaced apart legs with eyes for a shackle pin; a shackle pin consisting of a cylindrical center portion with an integral collar at one end, and a separable collar slidably mounted on said pin near the free end opposite said integral collar; wedge key means on said separable collar for temporarily holding said separable collar, and means on said pin to locate said separable collar in selected position on said pin pending the permanent welding of said separate collar to said pin.

6. The shackle assembly as defined in claim 5 in which the said wedge key means consists of an axially extending flat key-contacting area on the periphery of the free end portion of said pin, and a wedge key affixed in an axial direction to the inside wall of said separable collar, said key on its inner face frictionally engaging said flat area, and said key on its outer face frictionally engaging the eye of one leg of said shackle.

7. The shackle assembly as defined in claim 5, in which the said wedge key means consists of an axially extending contact area of greater radius than the central portion of said pin on the periphery of the free end portion of said pin, and a wedge key affixed in an axial direction to the inside wall of said separable collar, said key on its inner face frictionally engaging said contact area, and said key on its outside face frictionally engaging the eye of one leg of said shackle.

8. In a U-shaped shackle assembly, a shackle pin comprising a cylindrical center portion having an integral collar at one end; a separable collar slidably mounted on said pin near the free end opposite said integral collar; and friction means on said separable collar for temporarily holding said collar on said pin pending the permanent welding of said separate collar to said pin.

9. The shackle pin as defined in claim 8, in which the said friction means consists of an axially extending flat area on the periphery of the free end portion of said pin, and a wedge key affixed in an axial direction to the inside wall of said separable collar, said key frictionally engaging said flat area.

10. The shackle pin as defined in claim 8, in which the said friction means consists of an axially extending contact area of greater radius than the central portion of said pin on the periphery of the free end portion of said pin, and a wedge key affixed in an axial direction to the inside wall of said separable collar, said key on its inner face frictionally engaging said contact area.

References Cited

UNITED STATES PATENTS

| 1,646,546 | 10/1927 | Larsen | 59—86 |
| 2,259,880 | 10/1941 | Ehmann | 59—86 |

FOREIGN PATENTS

| 750,734 | 6/1956 | Great Britain. |
| 50,830 | 5/1932 | Norway. |

CHARLES W. LANHAM, Primary Examiner

GENE P. CROSBY, Assistant Examiner

U.S. Cl. X.R.

263—33